Patented Feb. 17, 1948

2,435,983

UNITED STATES PATENT OFFICE 2,435,983

PRODUCTION OF LIQUID HYDROCARBONS

Louis Schmerling, Riverside, Ill., assignor to Universal Oil Products Company, Chicago, Ill., a corporation of Delaware No Drawing. Application December 1, 1945, Serial No. 632,289

8 Claims. (Cl. 260—677)

This invention relates to the production of normally liquid hydrocarbons by the interaction of a monohaloalkane and an olefin in the presence of an acid catalyst. More particularly, the process relates to the formation of normally liquid olefinic hydrocarbons by reaction of a normally gaseous olefin and a monohaloalkane preferably having at least 2 carbon atoms per molecule in the presence of a phosphoric acid catalyst.

An object of this invention is to provide a method for producing normally liquid hydrocarbons by reacting a mono-olefin and a monohaloalkane in the presence of a phosphoric acid catalyst.

Another object of this invention is to produce normally liquid hydrocarbons of gasoline boiling range by reacting a normally gaseous mono-olefin and a monohaloalkane having at least 2 carbon atoms per molecule in the presence of a calcined composite of an acid of phosphorus and a carrier.

A further object of this invention is to produce normally liquid hydrocarbons by reacting ethylene and a monochloroalkane in the presence of a calcined composite of a phosphoric acid and diatomaceous earth.

One specific embodiment of the present invention relates to a process for producing liquid mono-olefinic hydrocarbons which comprises converting an olefin into a monohaloalkane and reacting said monohaloalkane and an olefin in the presence of a phosphoric acid catalyst at a temperature of from about 500° to about 750° F.

Another embodiment of this invention relates to a process for producing mixed polymers from ethylene and a higher mono-olefin which comprises converting said higher mono-olefin into a monochloroalkane, and reacting said monochloroalkane and ethylene in the presence of a calcined composite of a phosphoric acid and diatomaceous earth at a temperature of from about 500° to about 750° F. and at a superatmospheric pressure.

According to the process of my invention an olefinic hydrocarbon and particularly ethylene is cross-polymerized with other olefins by converting the latter into monochloroalkanes and then contacting a mixture of said monochloroalkanes and the first olefin, usually ethylene, with a phosphoric acid catalyst, preferably a solid phosphoric acid catalyst comprising essentially a calcined composite of an acid of phosphorus and a suitable carrier such as diatomaceous earth. This process has an advantage over the process used hitherto wherein attempts have been made to polymerize the olefin mixtures themselves, the chief advantage of my process being that it permits the utilization of ethylene, a monoolefinic hydrocarbon which does not readily polymerize with other olefins to form cross polymers.

Acid catalysts utilizable in my process comprise particularly the acids of phosphorus including orthophosphoric, pyrophosphoric, tetraphosphoric and other acids of phosphorus utilized as such or preferably supported by a suitable carrier, which is generally a siliceous material such as silica, diatomaceous earth, activated clay, etc. Such composites of an acid of phosphorus and a carrier, after suitable mixing, are formed into particles by extrusion, drying and calcining methods or the mixed composite is calcined, crushed and screened to form particles of a desired mesh size suitable for use as a reactor filling material. The calcination of the catalyst is generally carried out at a temperature of from about 500° to about 1000° F. and this treatment is followed by steaming at 500° to 600° F. and a brief drying in air at the latter temperature.

My process is carried out by commingling a normally gaseous olefin such ethylene, propylene, etc. and a monohaloalkane in the presence of a phosphoric acid catalyst maintained at a temperature of from about 500° to about 750° F. and preferably at a superatmospheric pressure, which is usually about 200 to about 600 pounds per square inch although other pressures are utilizable which seldom exceed about 2000 pounds per square inch. This process may be effected in either batch type treatments or it is preferably carried out continuously. Continuous operation is effected by passing a mixture of a mono-olefin or a hydrocarbon fraction containing mono-olefins, and a monohaloalkane through a heated reactor containing a granular solid phosphoric acid catalyst comprising essentially a precalcined composite of an acid of phosphorus and a carrier, such as diatomaceous earth, silica gel, etc. The resultant reaction products are then fractionally distilled or separated by other suitable means to remove unconverted mono-olefinic hydrocarbons and monohaloalkanes from higher boiling normally liquid products comprising essentially mono-olefins formed in the process. Thus, when isopropyl chloride and ethylene are passed simultaneously over a calcined composite of pyrophosphoric acid and diatomaceous earth at a temperature within the above indicated limits, a normally liquid product is obtained containing heptenes, octenes, and other olefins of higher molecular weight. The reaction also gives ethyl chloride, the latter being suitable for recycling to the reaction to which the fresh mixture of ethylene and isopropyl chloride is introduced.

An alternative procedure consists in cross-polymerizing ethylene and propylene in the presence of solid phosphoric acid catalyst and of isopropyl chloride or hydrogen chloride, these materials being employed in an amount generally from about 1 to about 10% by weight of the reactants being passed over the solid catalyst.

The following example is given of results obtained by the process, although these data are not to be considered as limiting the broad scope of the invention.

Through a steel reactor containing 20 cc. of 5x5 mm., pellets of a calcined composite of pyrophosphoric acid and diatomaceous earth, ethylene was passed at a rate of 28 liters per hour and isopropyl chloride was simultaneously pumped through the reactor at a rate of 36 grams per hour. A normally liquid product was obtained at the rate of 25 grams per hour and ethyl chloride was formed at a rate of 25 grams per hour. About 1.4 molecular proportions of ethylene were consumed per molecular proportion of isopropyl chloride which reacted. A large amount of the ethylene which reacted was converted into ethyl chloride but the remainder copolymerized with propylene, forming a polymer, at least 30% of which boiled in the boiling range of octene. This octene mixture upon being hydrogenated catalytically yielded an octane fraction containing dimethylhexanes and methyl heptanes as evidenced by infra red absorption spectra results.

The foregoing specification and example should not be construed to limit the broad scope of this invention.

I claim as my invention:

1. A process for producing liquid mono-olefinic hydrocarbons which comprises reacting a monohaloalkane and a mono-olefin in the presence of a phosphoric acid catalyst at a temperature of from about 500° to about 750° F.

2. A process for producing a normally liquid mono-olefin which comprises reacting a monochloroalkane and ethylene in the presence of a calcined composite of a phosphoric acid and diatomaceous earth at a temperature of from about 500° to about 750° F. and at a superatmospheric pressure.

3. A process for producing normally liquid hydrocarbons which comprises reacting a mono-olefinic hydrocarbon and a monohaloalkane in the presence of a phosphoric acid catalyst at conversion conditions of temperature and pressure.

4. A process for producing normally liquid hydrocarbons which comprises reacting a mono-olefinic hydrocarbon and a monochloroalkane in the presence of a phosphoric acid catalyst at conversion conditions of temperature and pressure.

5. A process for producing a mono-olefinic hydrocarbon having at least 4 carbon atoms per molecule which comprises reacting a mono-olefin and a monohaloalkane having at least 2 carbon atoms per molecule in the presence of a phosphoric acid catalyst at a temperature of from about 500° to about 750° F.

6. A process for producing a mono-olefinic hydrocarbon which comprises reacting a normally gaseous mono-olefinic hydrocarbon and a monohaloalkane in the presence of a calcined composite of an acid of phosphorus and a carrier at a temperature of from about 500° to about 750° F. and at a superatmospheric pressure.

7. A process for producing a mono-olefinic hydrocarbon which comprises reacting a normally gaseous mono-olefinic hydrocarbon and a monochloroalkane in the presence of a calcined composite of an acid of phosphorus and diatomaceous earth at a temperature of from about 500° to about 750° F. and at a superatmospheric pressure.

8. A process for producing a mono-olefinic hydrocarbon which comprises reacting ethylene and a monochloroalkane having at least 2 carbon atoms per molecule in the presence of a calcined composite of an acid of phosphorus and diatomaceous earth at a temperature of from about 500° to about 750° F. and at a superatmospheric pressure.

LOUIS SCHMERLING.

REFERENCES CITED

The following references are of record in the file of this patent:

UNITED STATES PATENTS

| Number | Name | Date |
|---|---|---|
| 2,353,766 | Schmerling | July 18, 1944 |
| 1,518,182 | Curme | Dec. 9, 1924 |

OTHER REFERENCES

Simons et al., J. A. C. S. 60, 2956–2957 (1938). (Copy in Patent Office Library.)